United States Patent
Rositch et al.

(10) Patent No.: US 10,611,203 B1
(45) Date of Patent: Apr. 7, 2020

(54) SUSPENSION ELEMENT LOCKOUT

(71) Applicant: Oshkosh Defense, LLC, Oshkosh, WI (US)

(72) Inventors: Aaron Rositch, Oshkosh, WI (US); Erik Ellifson, Oshkosh, WI (US); Patrick Dillman, Hartford, WI (US); Kai Schubart, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 1 day.

(21) Appl. No.: 15/956,992

(22) Filed: Apr. 19, 2018

Related U.S. Application Data

(60) Provisional application No. 62/491,193, filed on Apr. 27, 2017.

(51) Int. Cl.
| | |
|---|---|
| *B60G 17/005* | (2006.01) |
| *F16F 9/56* | (2006.01) |
| *B60G 15/12* | (2006.01) |
| *F16F 9/06* | (2006.01) |
| *F16F 9/346* | (2006.01) |

(52) U.S. Cl.
CPC ........... *B60G 17/005* (2013.01); *B60G 15/12* (2013.01); *F16F 9/061* (2013.01); *F16F 9/067* (2013.01); *F16F 9/068* (2013.01); *F16F 9/346* (2013.01); *F16F 9/56* (2013.01); *B60G 2202/30* (2013.01)

(58) Field of Classification Search
CPC . B60G 17/005; F16D 9/56; F16D 9/58; F16D 9/061; F16D 9/063; F16D 9/3257
USPC ........................................................ 188/300
See application file for complete search history.

(56) References Cited

U.S. PATENT DOCUMENTS

| | | | | |
|---|---|---|---|---|
| 4,382,311 A | * | 5/1983 | Watts ........................ | E05F 3/02 16/66 |
| 4,811,983 A | * | 3/1989 | Watts ........................ | E02F 9/00 180/89.14 |
| 5,046,755 A | * | 9/1991 | Runkel ................ | B60G 17/005 137/512 |

(Continued)

FOREIGN PATENT DOCUMENTS

| | | | | |
|---|---|---|---|---|
| DE | 3935608 A1 | * | 5/1991 | ........... B60G 17/005 |
| DE | 4003200 A1 | * | 8/1991 | ............. B60G 15/12 |

OTHER PUBLICATIONS

EPO translation, DE 3935608 A1, May 1991. (Year: 1991).*
EPO translation, DE 4003200 A1, Aug. 1991. (Year: 1991).*

*Primary Examiner* — Thomas J Williams
(74) *Attorney, Agent, or Firm* — Foley & Lardner LLP

(57) ABSTRACT

A suspension element includes a main body having an end cap defining an internal volume and a tubular element slidably engaged with the main body. The suspension element further includes a first piston and a flow control element. The flow control element is configured to prevent movement of the tubular element relative the main body in a direction. The suspension element may further include a locking member and a piston. The locking member may be configured to engage a barrier of the main body when the first piston traverses at least a predetermined distance towards the end cap. The locking member may be affixed to the tubular element and may fully surround the tubular element. Together the flow control element and the locking member are configured to prevent movement of the suspension element.

13 Claims, 11 Drawing Sheets

(56) References Cited

U.S. PATENT DOCUMENTS

| | | | |
|---|---|---|---|
| 5,383,680 A * | 1/1995 | Bock | B60G 17/005 280/5.502 |
| 5,536,036 A * | 7/1996 | Ehrlich | B60G 17/005 280/124.116 |
| 6,129,368 A * | 10/2000 | Ishikawa | B60G 17/005 280/124.112 |
| 6,247,564 B1 * | 6/2001 | Kim | B60G 17/005 188/271 |
| 8,333,390 B2 | 12/2012 | Linsmeier et al. | |
| 8,459,619 B2 | 6/2013 | Trinh et al. | |
| 8,465,025 B2 | 6/2013 | Venton-Walters et al. | |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,821,130 B2 | 9/2014 | Venton-Walters et al. | |
| 8,876,133 B2 | 11/2014 | Ellifson | |
| 8,991,834 B2 | 3/2015 | To et al. | |
| 8,991,840 B2 | 3/2015 | Zuleger et al. | |
| 9,022,185 B2 * | 5/2015 | Kanioz | D06F 37/20 188/272 |
| 9,114,808 B2 | 8/2015 | Ogata et al. | |
| 9,127,738 B2 | 9/2015 | Ellifson et al. | |
| 9,132,736 B1 | 9/2015 | Shukla et al. | |
| 9,174,686 B1 | 11/2015 | Messina et al. | |
| 9,291,230 B2 | 3/2016 | Ellifson et al. | |
| 9,303,715 B2 | 4/2016 | Dillman et al. | |
| 9,327,576 B2 | 5/2016 | Ellifson | |
| 9,581,153 B2 | 2/2017 | Venton-Walters et al. | |
| 9,669,679 B2 | 6/2017 | Zuleger et al. | |
| 9,688,112 B2 | 6/2017 | Venton-Walters et al. | |
| 9,707,869 B1 | 7/2017 | Messina et al. | |
| 9,765,841 B2 | 9/2017 | Ellifson et al. | |
| 9,809,080 B2 | 11/2017 | Ellifson et al. | |
| 9,944,145 B2 | 4/2018 | Dillman et al. | |
| 10,030,737 B2 | 7/2018 | Dillman et al. | |
| 2015/0316039 A1 * | 11/2015 | Tucker | F01C 1/103 280/5.5 |

* cited by examiner

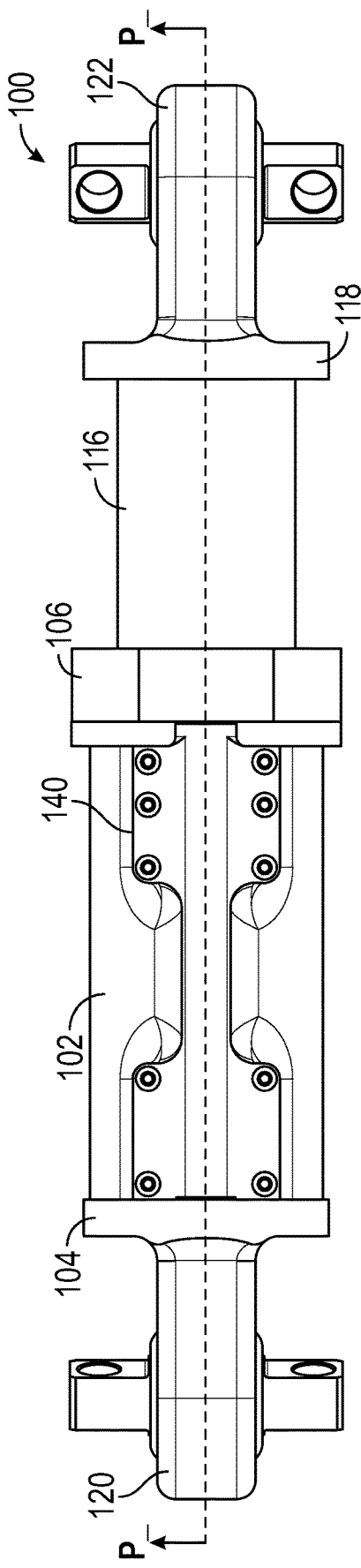
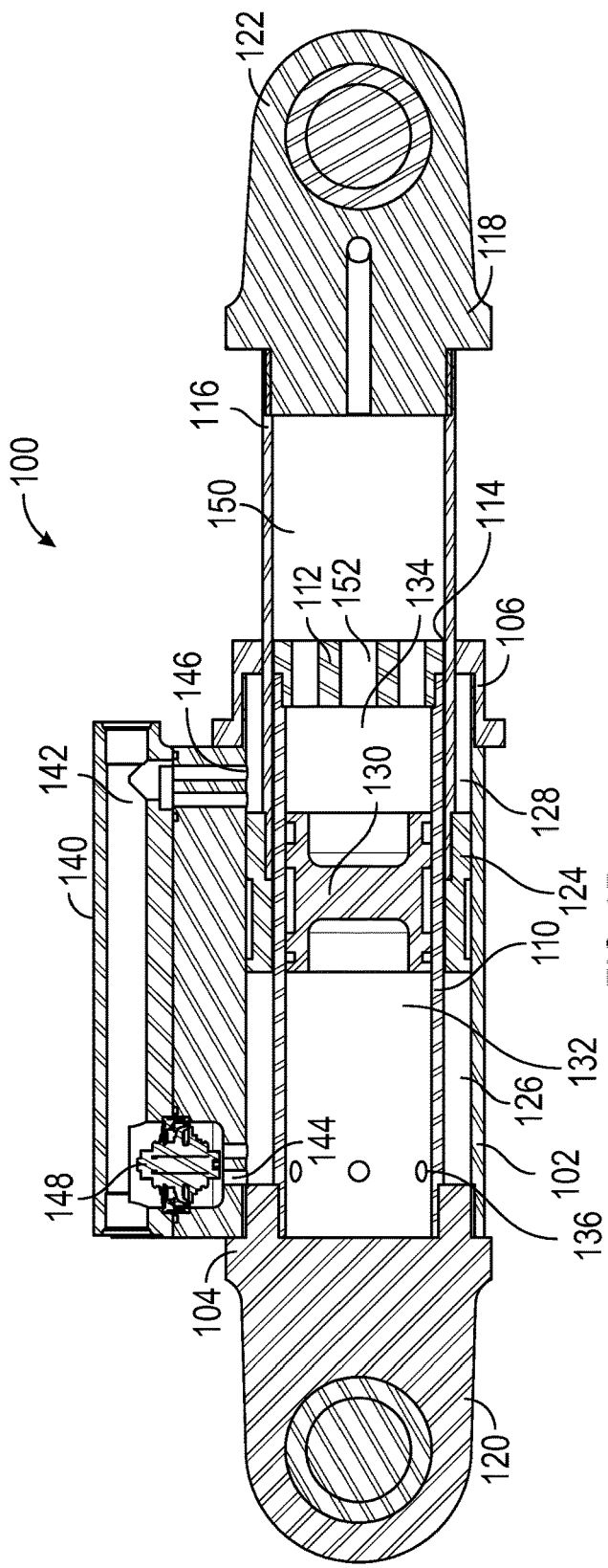
FIG. 3A
FIG. 3B

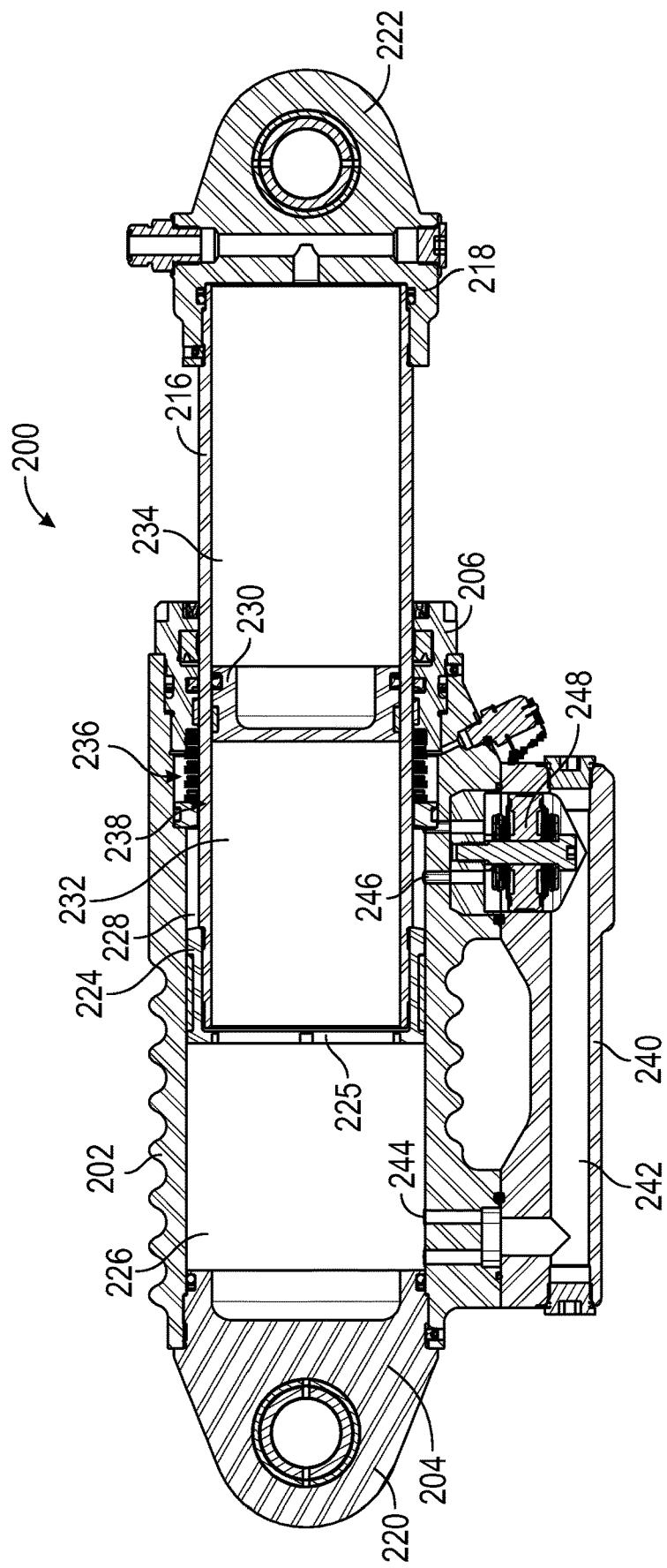

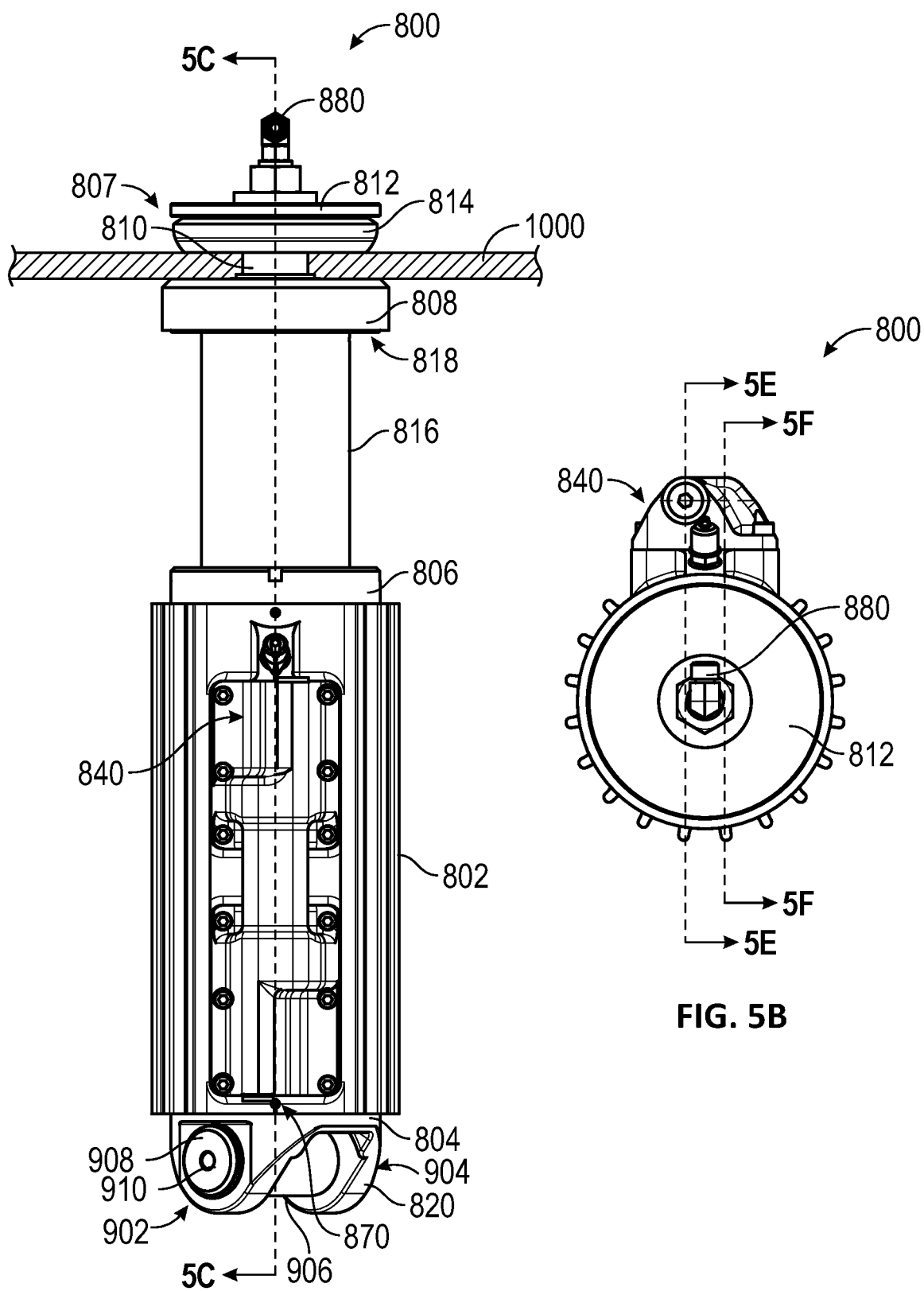
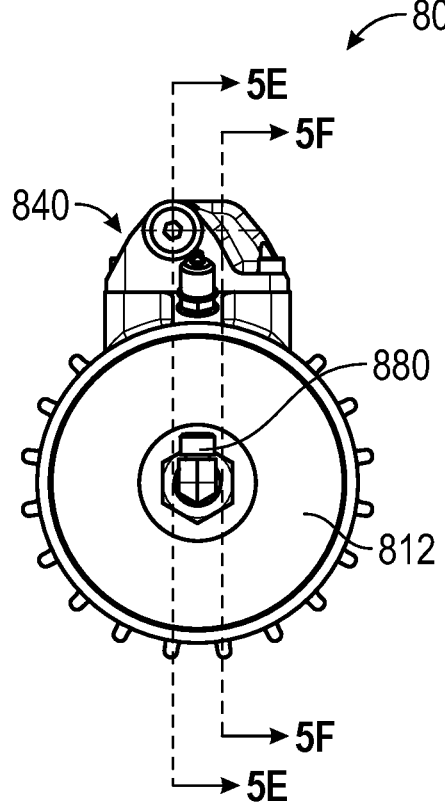
FIG. 5A
FIG. 5B

SUSPENSION ELEMENT LOCKOUT

CROSS-REFERENCE TO RELATED APPLICATIONS

This application claims the benefit of U.S. Provisional Application No. 62/491,193, filed Apr. 27, 2017, which is incorporated herein by reference in its entirety.

BACKGROUND

The present disclosure relates generally to the field of vehicle suspension systems. More specifically, the present disclosure relates to suspension elements that may be used in independent suspension systems.

Suspension systems traditionally couple a body of a vehicle to one or more axles. Such suspension systems may include solid axle suspension systems or independent suspension systems, among others. Independent suspension systems facilitate independent wheel movement as the vehicle encounters one or more obstacles (e.g., uneven terrain, potholes, curbs, etc.). The independent suspension system reduces the forces experienced by passengers as the vehicle encounters the obstacles. Independent suspension systems include one or more arms (e.g., A-arms, swing arms, etc.) that are coupled to a hub, to which a wheel and tire assembly is attached. Various suspension components are coupled to the arms and the body of the vehicle.

SUMMARY

One embodiment relates to a suspension element for use with a vehicle. The suspension element includes a main body having an internal volume. The main body includes a barrier at one end. In some embodiments, the main body includes an end cap disposed on an opposite end. A tubular element is slidably engaged with the main body. The suspension element further includes a first piston coupled to the tubular element, and a flow control element having at least two flow states. Advantageously, the flow control element is configured to prevent movement of the tubular element relative the main body in a direction.

In the above embodiment, the suspension element may also include a passage disposed between a first chamber and a second chamber formed by the main piston. The flow control element may be disposed along the passage and affixed to the passage. In any of the above embodiments, the passage may be disposed between a first opening and a second opening of the main body. The flow control element may be configured to switch from an open state to a closed state when the pressure at the first opening is greater than the pressure at the second opening by more than a threshold amount.

In any of the above embodiments, the suspension element may further include a locking member disposed proximal an external surface of the tubular element. The locking member may be configured to engage the barrier in response to the tubular element traversing a predetermined distance within the inner volume, thereby preventing further transversal of the tubular element. In some of the above embodiments, the locking member may be affixed to an outer surface of the tubular element. In other embodiments, the locking member is a collar that extends around the entire circumference of the tubular element. Among other benefits, the collar may provide a more evenly distributed force on the tubular element and the barrier. In some of the above embodiments, an upper end of the locking member may be approximately flush with the cap disposed on the tubular element, again reducing the force on the tubular element.

Together, the flow control element and the tubular element may work in concert to prevent movement of the tubular element relative the main body. In some of the above embodiments, the flow control element may prevent movement of the tubular element relative the main body toward an extended position, while the locking member prevents movement of the tubular element relative the main body toward a compressed position.

The invention is capable of other embodiments and of being carried out in various ways. Alternative exemplary embodiments relate to other features and combinations of features as may be recited in the claims.

BRIEF DESCRIPTION OF THE DRAWINGS

FIG. 3A is a side view of a suspension element, according to an illustrative embodiment.

FIG. 3B is a sectional view of the suspension element of FIG. 3A.

FIG. 4 is a sectional view of a suspension element, according to an illustrative embodiment.

FIG. 5A is a side view of a suspension element, according to an illustrative embodiment.

FIG. 5B is a top view of the suspension element of FIG. 5A.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle may include a body supported by a suspension system. In some embodiments, the vehicle is a military vehicle. In other embodiments, the vehicle is a utility vehicle, such as a fire truck, a tractor, construction equipment, or a sport utility vehicle. The vehicle may be configured for operation on both paved and rough, off-road terrain. The suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

Figure 1:
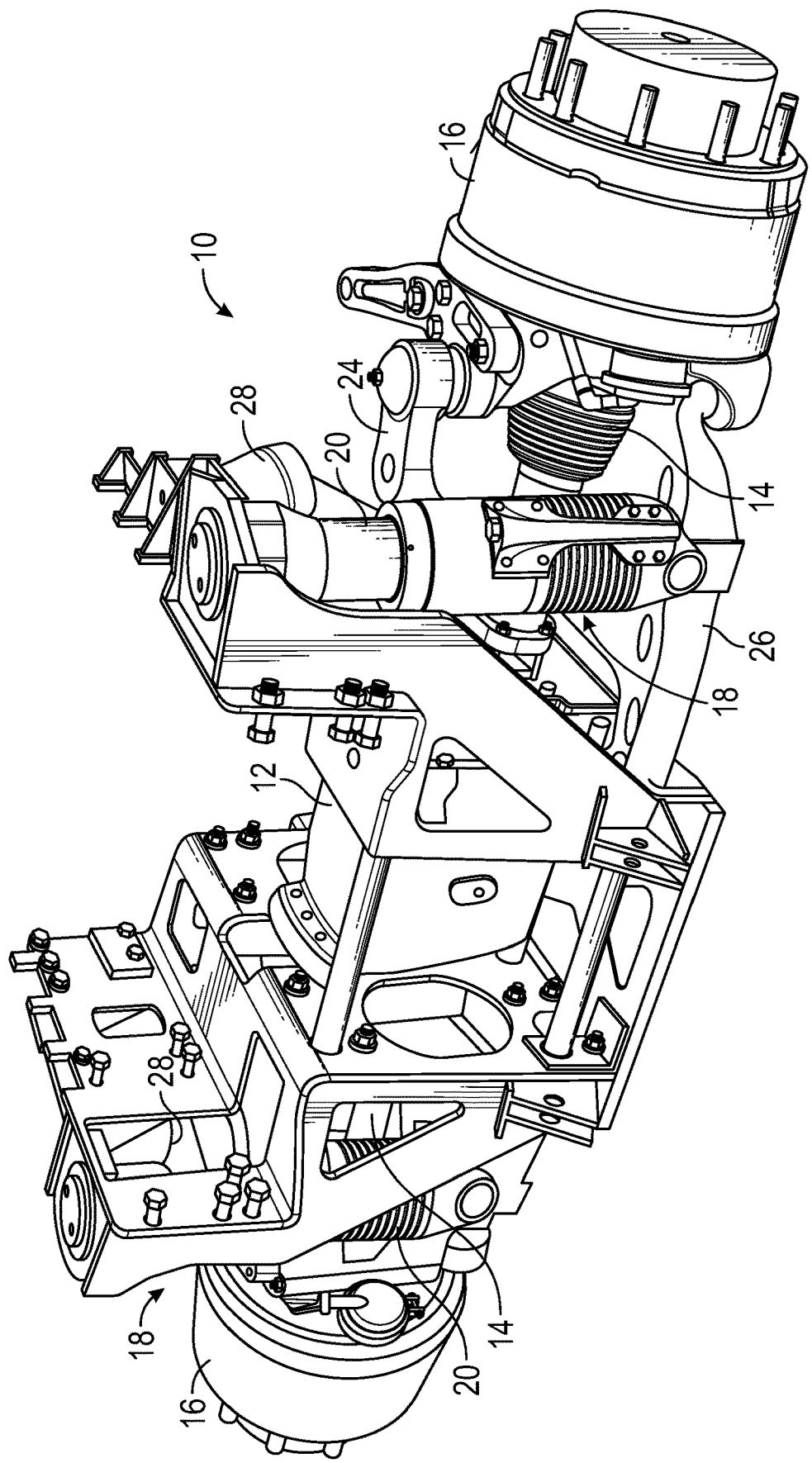
FIGS. 1 and 2 are perspective views of axle assemblies, according to illustrative embodiments.
Figure 2:
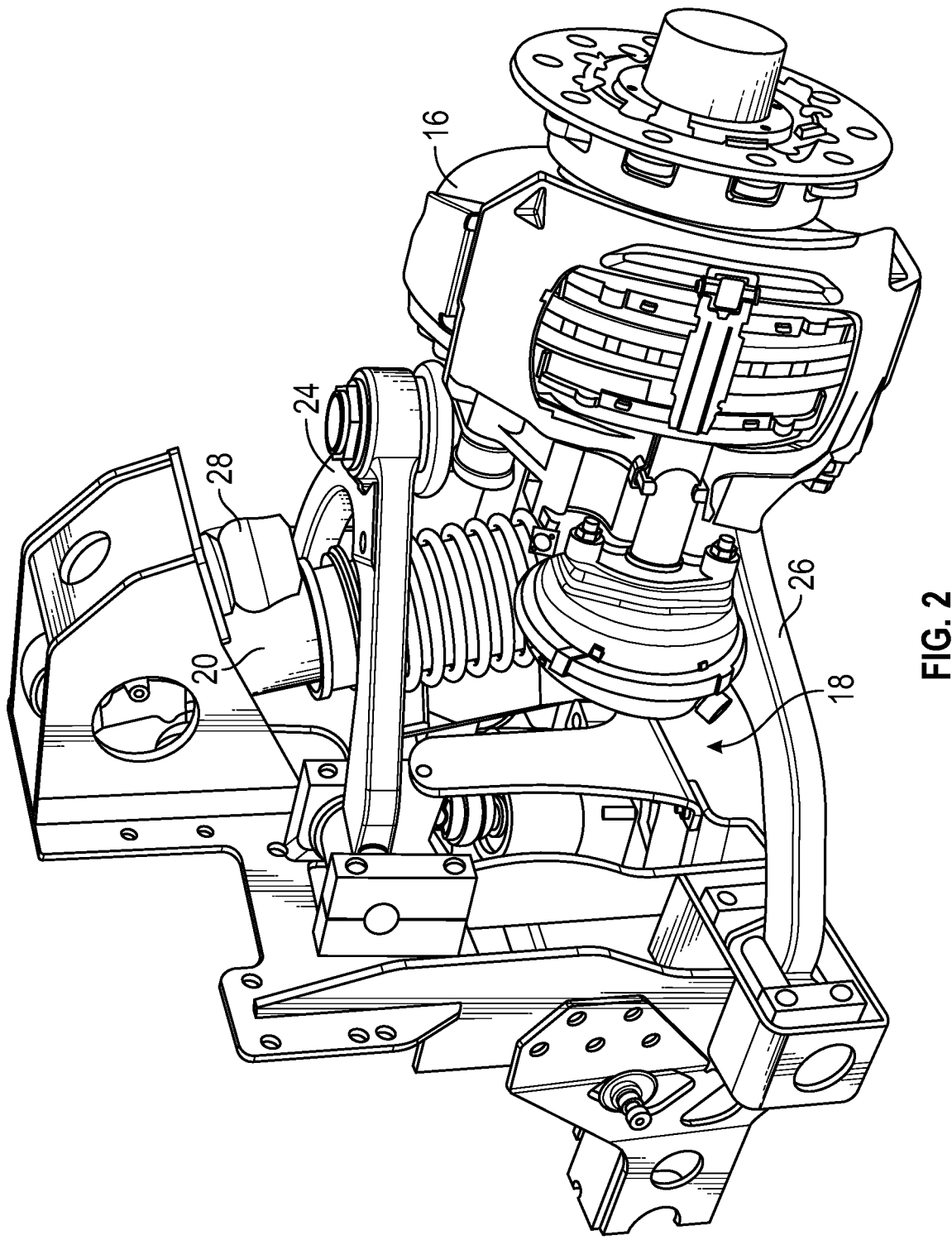

Referring to FIGS. 1-2, an axle assembly is configured for use with the vehicle. According to the exemplary embodiment shown in FIG. 1, an axle assembly 10 includes a differential 12 connected to half shafts 14, which are each connected to a wheel end assembly 16. As shown in FIG. 2, wheel end assembly 16 is not connected to a differential 12 by a half shaft 14. As shown in FIGS. 1-2, the wheel end assembly 16 is at least partially controlled (e.g., supported) by a suspension system 18, which includes a suspension element, shown as integrated spring damper 20, an upper support arm 24, and a lower support arm 26 coupling the wheel end assembly 16 to the vehicle body or part thereof (e.g., chassis, side plate, hull, etc.). As shown in FIGS. 1-2, suspension system 18 including integrated spring damper 20 may be implemented on a driven axle or a non-driven axle of a vehicle (e.g., an axle that includes or does not include a differential, half shaft, drive motor, or other component configured to provide a motive force, etc.).

According to an exemplary embodiment, the differential 12 is configured to be connected with a drive shaft of the vehicle, receiving rotational energy from a prime mover of the vehicle, such as a diesel engine. The differential 12 allocates torque provided by the prime mover between half shafts 14 of the axle assembly 10. The half shafts 14 deliver the rotational energy to the wheel end assemblies 16 of the axle assembly 10. The wheel end assemblies 16 may include brakes (e.g., disc brakes, drum brakes, etc.), gear reductions, steering components, wheel hubs, wheels, and other features. As shown in FIG. 2, the wheel end assemblies 16 include disc brakes. As the vehicle travels over uneven terrain, the upper and lower support arms 24, 26 at least partially guide the movement of each wheel end assembly 16, and a stopper 28 provides an upper bound for movement of the wheel end assembly 16.

According to the exemplary embodiment shown in FIGS. 3A-3B, an integrated spring damper 100 is configured to act as a damper (e.g., a hydraulic damper) and a spring (e.g., a high pressure gas spring). The integrated spring damper 100 includes a main body 102 (e.g., cylinder, housing, base, etc.). In one embodiment, main body 102 is tubular. The ends of the main body 102 are closed by an end cap 104 and a barrier 106 to define an internal volume. The internal volume may be configured to contain a liquid therein. The internal volume of the main body 102 is separated into a central chamber and an annular, outer chamber by an inner tube 110 that extends from the end cap 104 to the barrier 106. The end of the inner tube 110 proximate to the barrier 106 is closed with a cap 112. The cap 112 may be generally aligned with the barrier 106 (e.g., received in a central opening 114 in the barrier 106). The integrated spring damper 100 further includes a tubular element (e.g., cylindrical, etc.), shown as main tube 116. In one embodiment, main tube 116 is tubular and defines an inner volume. The main tube 116 is received in the annular chamber of the internal volume of the main body 102 through the barrier 106. The main tube 116 may be slidably engaged with the main body 102 such that the main tube 116 is configured to translate with respect to the main body 102; for example, the main tube may be configured to translate between a compressed position, where an end of the main tube 116 is proximate to the cap 112, and an extended position, where an end of the main tube 116 is proximate to the barrier 106. According to an exemplary embodiment, the main tube 116 has an inner diameter that is approximately equal to the outer diameter of the inner tube 110 such that the inner tube 110 is received in the main tube 116 when the main tube 116 is disposed within the internal volume of the main body 102. The distal end of the main tube 116 is closed by a cap 118. The end cap 104, barrier 106, cap 112, and cap 118 may be coupled to the respective components with a threaded connection or with another coupling mechanism (e.g., welding, brazing, interference fit, etc.).

According to an exemplary embodiment, the integrated spring damper 100 includes a first eyelet 120 and a second eyelet 122 with which the integrated spring damper 100 is coupled to an axle assembly. According to an exemplary embodiment, the integrated spring damper 100 is coupled on one end (e.g., with the first eyelet 120) to a moveable member of the axle assembly (e.g., an upper support arm, a lower support arm, etc.) and on the other end (e.g., with the second eyelet 122) to the vehicle body or part thereof (e.g., chassis, side plate, hull). According to an exemplary embodiment, the first eyelet 120 and the second eyelet are integrally formed with the end cap 104 and the cap 118, respectively.

A main piston 124 is disposed in the outer annular chamber defined between the main body 102 and the inner tube 110. The main piston 124 is coupled to the main tube 116 and extends to an inner surface of the main body 102. The main piston 124 separates the outer annular chamber into first chamber, shown as first annular chamber 126 and a second chamber, shown as annular chamber 128. When the main tube 116 translates relative to the main body 102, the main piston 124 changes the volume of the first annular chamber 126 and the second annular chamber 128; for example, the main tube 116 may be configured to translate between a compressed position, where the main piston 124 is proximate to the end cap 104, and an extended position, where the main piston 124 is proximate to the barrier 106. A dividing piston 130 (e.g., floating piston) is disposed in the inner chamber defined by the inner tube 110. The dividing piston 130 slidably engages the inner tube 110. The dividing piston 130 separates the inner chamber into first inner chamber 132 and a second inner chamber 134. The pistons 124 and 130 may be coupled to the sidewalls of the main body 102 and the inner tube 110 with a seal or other interfacing member (e.g., ring, wear band, guide ring, wear ring, etc.).

The first annular chamber 126, the second annular chamber 128, and the first inner chamber 132 contain a generally non-compressible fluid. In one embodiment, the first annular chamber 126, the second annular chamber 128, and the first inner chamber 132 are hydraulic chambers configured to contain a hydraulic fluid therein (e.g., water, hydraulic oil, etc.). The first inner chamber 132 is in fluid communication with the first annular chamber 126 through apertures 136 in the inner tube 110. The fluid may flow between the first annular chamber 126 and the second annular chamber 128 through a passage 142 (e.g., conduit, bore, etc.) in a bypass manifold 140. According to an exemplary embodiment, the bypass manifold 140 is a structure coupled (e.g., bolted) to the side of the main body 102 and the passage 142 is in fluid communication with the first annular chamber 126 through an aperture 144 in the main body 102 and with the second annular chamber 128 through an aperture 146 in the main body 102. Providing the bypass manifold 140 as a separate component coupled to the exterior of the main body 102 allows the bypass manifold 140 to be replaced to vary the behavior of the integrated spring damper 100, such as by changing the valving or adding optional features (e.g., position dependency).

The flow of fluid through the passage 142 is controlled by a flow control device 148. According to an exemplary embodiment, the flow control device 148 is a disk valve disposed within the bypass manifold 140 along the passage 142. In other embodiments, the flow control device 148 may be another device, such as a pop off valve, or an orifice. In other embodiments, the flow control device remotely positioned but in fluid communication with the first annular chamber 126 and the second annular chamber 128.

The second inner chamber 134 contains a generally compressible fluid that may include (e.g., at least 90%, at least 95%) an inert gas such as nitrogen, argon, or helium, among others. The second inner chamber 134 is in fluid communication with the internal volume 150 of the main tube 116 through apertures 152 in the cap 112. In some embodiments, the internal volume 150 of the main tube 116 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper 100 is compressed or extended, the main tube 116 translates relative to the main body 102. The gas held in the second inner chamber 134 compresses or expands in response to relative movement between the main tube 116 and the dividing piston 130, which may remain relatively stationary but transmit pressure variations between the incompressible hydraulic fluid in the first inner chamber 132 and the compressible fluid in second inner chamber 134. The gas in the second inner chamber 134 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper 100.

Movement of the main tube 116 relative to the main body 102 translates the main piston 124, causing the volume of the first annular chamber 126 and the second annular chamber 128 to vary. When the integrated spring damper 100 compresses, the volume of the first annular chamber 126 decreases while the volume of the second annular chamber 128 increases. The fluid is forced from the first annular chamber 126 through the passage 142 and past the flow control device 148 into the second annular chamber 128. The resistance to the flow of the fluid through the passage provides a damping function for the integrated spring damper 100 that is independent of the spring function. Movement of the main piston 124 also changes the pressure of the fluid within first inner chamber 132. Such pressure variation imparts a force on a first side of the dividing piston 130 that varies the pressure of the fluid within the second inner chamber 134.

Referring to FIG. 4, an integrated spring damper 200 is shown, according to another exemplary embodiment. The integrated spring damper 200 includes a tubular (e.g., cylindrical, etc.) main body 202 (e.g., cylinder, housing, base, etc.). The ends of the main body 202 are closed by an end cap 204 and a barrier 206 to define an internal volume. The integrated spring damper 200 further includes a tubular (e.g., cylindrical, etc.) main tube 216. The main tube 216 is received in the internal volume of the main body 202. The main tube 216 is configured to translate with respect to the main body 202. The distal end of the main tube 216 is closed by a cap 218. The end cap 204, barrier 206, and cap 218 may be coupled to the respective components with a threaded connection or with another coupling mechanism (e.g., welding, brazing, interference fit, etc.).

According to an exemplary embodiment, the integrated spring damper 200 includes a first eyelet 220 and a second eyelet 222 with which the integrated spring damper 200 is coupled to an axle assembly. According to an exemplary embodiment, the integrated spring damper 200 is coupled on one end (e.g., with the first eyelet 220) to a moveable member of the axle assembly (e.g., an upper support arm, a lower support arm, etc.) and on the other end (e.g., with the second eyelet 222) to the vehicle body or part thereof (e.g., chassis, side plate, hull). According to an exemplary embodiment, the first eyelet 220 and the second eyelet 222 are integrally formed with the end cap 204 and the cap 218, respectively.

A main piston 224 is disposed in the internal volume of the main body 202. The main piston 224 is coupled to the main tube 216 and slidably engages the main body 202. The main piston 224 separates the internal volume into a first chamber 226 (e.g., compression chamber) and a second chamber 228 (e.g., extension chamber). The first chamber 226 is a generally cylindrical chamber comprising the portion of the internal volume of the main body 202 between the main piston 224 and the end cap 204. The second chamber 228 is an annular chamber defined between the main body 202 and the main tube 216 and extends between the main piston 224 and the barrier 206. When the main tube 216 translates relative to the main body 202, the main piston 224 changes the volume of the first chamber 226 and the second chamber 228. A dividing piston 230 (e.g., floating piston) is disposed in the main tube 216 and slidably engages the main tube 216. The dividing piston 230 separates the internal volume of the main tube 216 into the first inner chamber 232 and a second inner chamber 234. According to an exemplary embodiment, the first inner chamber 232 is open to (i.e., in fluid communication with) the first chamber 226.

A limiter, shown as recoil damper 236, is disposed within the internal volume of the main body 202 between the main piston 224 and the barrier 206. The recoil damper 236 is intended to reduce the risk of damage to the main piston 224, barrier 206, the sidewall of main body 202, or still another component of integrated spring damper 200 by reducing the forces imparted by the main piston 224 as it travels toward an end of stroke. According to an exemplary embodiment, the recoil damper 236 includes a recoil piston 238 positioned within the second chamber 228 and a resilient member such as an interlaced wave spring (i.e., a flat wire compression spring), a coil spring, or another type of spring. The resilient member may be disposed between the recoil piston 238 and the barrier 206. According to an exemplary embodiment, the resilient member is not intended to damp the movement of the main piston 224 but positions the recoil piston 238 within the main body 202, such as after it has been displaced by the main piston 224. In other embodiments, the recoil damper 236 may not include a resilient member and the recoil piston 238 may be repositioned using gravity or an alternative device.

Occupants within a vehicle experience large impulse forces as the main piston 224 contacts the barrier 206 or a component of the suspension system engages a hard stop. The recoil damper 236 reduces such impulse forces transmitted to occupants within the vehicle by dissipating a portion of the kinetic energy of the main piston 224 and the main tube 216 (i.e., provide a supplemental damping force) as the integrated spring damper 200 reaches an end of stroke (e.g., as the piston reaches a recoil end of stroke, as the piston reaches a jounce end of stroke, etc.).

The first chamber 226, the second chamber 228, and the first inner chamber 232 contain a generally non-compressible fluid (e.g., hydraulic fluid, oil, etc.). The first inner chamber 232 is in fluid communication with the first chamber 226 through an opening 225 in the main piston 224. The fluid may flow between the first chamber 226 and the second chamber 228 through a passage 242 (e.g., conduit, bore, etc.) in a bypass manifold 240. According to an exemplary embodiment, the bypass manifold 240 is a structure coupled to the side of the main body 202. The passage 242 is in fluid communication with the first chamber 226 through an aperture 244 in the main body 202 and with the second chamber 228 through an aperture 246 in the main body 202. According to an exemplary embodiment, the aperture 246 opens into the second chamber 228 between the main piston 224 and the recoil piston 238. The flow of fluid through the passage 242 is controlled by a flow control device 248. According to an exemplary embodiment, the flow control device 248 is a disk valve disposed within the bypass manifold 240 along the passage 242. In other embodiments, the flow control device 248 may be another device, such as a pop off valve, or an orifice. In other embodiments, the flow control device remotely positioned but in fluid communication with the first chamber 226 and the second chamber 228.

The second inner chamber 234 contains a generally compressible fluid that may include (e.g., at least 90%, at least 95%) an inert gas such as nitrogen, argon, or helium, among others. In some embodiments, the second inner chamber 234 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper 200 is compressed or extended, the main tube 216 translates relative to the main body 202. The gas held in the second inner chamber 234 compresses or expands in response to relative movement between the main tube 216 and the dividing piston 230, which may remain relatively stationary but transmit pressure variations between the incompressible hydraulic fluid in the first inner chamber 232 and the compressible fluid in second inner chamber 234. The gas in the second inner chamber 234 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper 200.

Movement of the main tube 216 relative to the main body 202 translates the main piston 224, causing the volume of the first chamber 226 and the second chamber 228 to vary. When the integrated spring damper 200 compresses, the volume of the first chamber 226 decreases while the volume of the second chamber 228 increases. The fluid is forced from the first chamber 226 through the passage 242 and past the flow control device 248 into the second chamber 228. The resistance to the flow of the fluid through the passage 242 provides a damping function for the integrated spring damper 200 that is independent of the spring function.

Figure 5C:
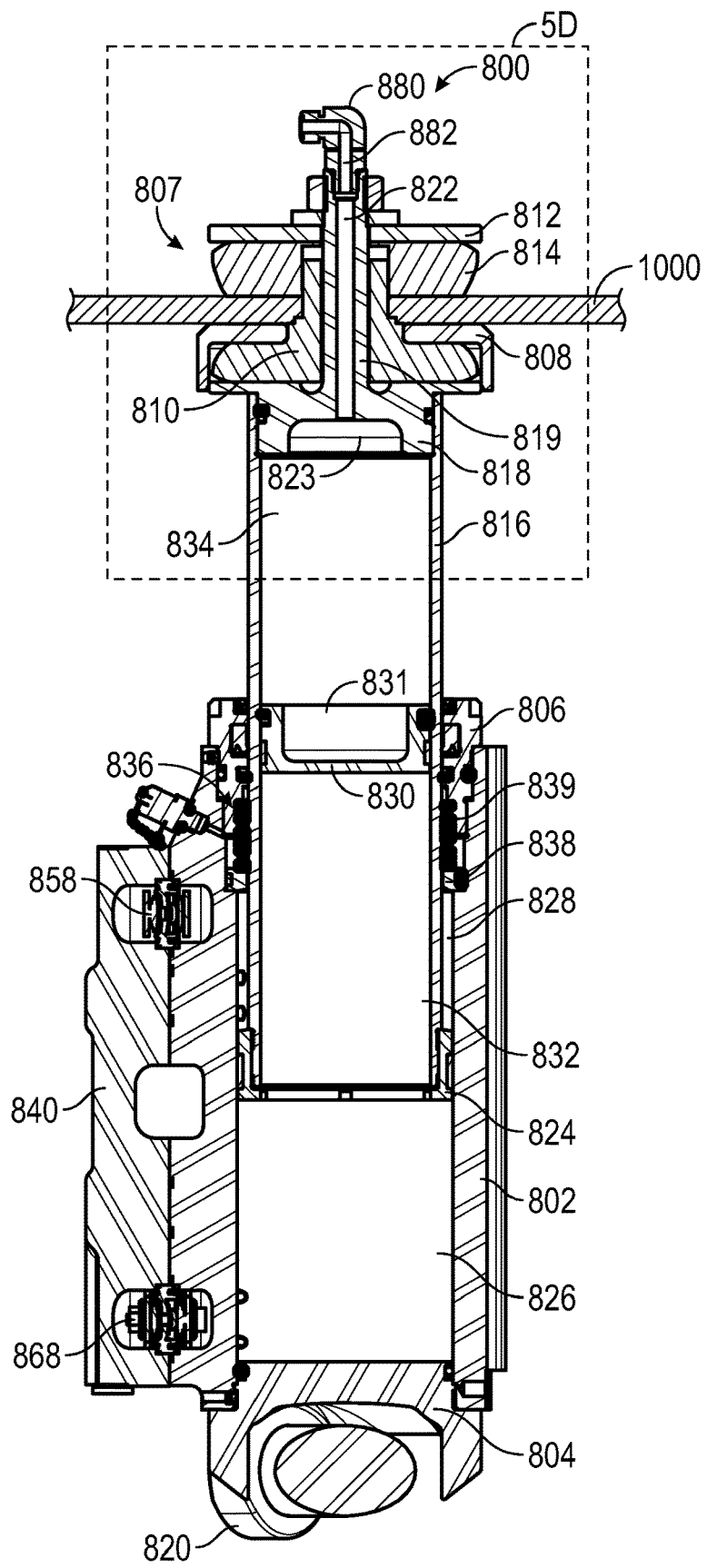
FIG. 5C is a sectional view of the suspension element of FIG. 5A.

Referring to FIGS. 5A-5F, an integrated spring damper 800 is shown, according to another exemplary embodiment. As shown in FIG. 5A, the integrated spring damper 800 includes a tubular (e.g., cylindrical, etc.) main body (e.g., cylinder, housing, base, etc.), shown as main body 802. In one embodiment, the main body 802 is manufactured using an extrusion process. In an alternative embodiment, the main body 802 is manufactured using a casting process. As shown in FIGS. 5A and 5C, a cap, shown as end cap 804, and a barrier, shown as barrier 806, are disposed on opposing ends of the main body 802, defining an internal volume. The integrated spring damper 800 further includes a tubular (e.g., cylindrical, etc.) element, shown as main tube 816. The main tube 816 is at least partially received within the internal volume of the main body 802. The main tube 816 is configured to translate with respect to the main body 802. As shown in FIG. 5C, a cap, shown as cap 818, is disposed at a distal end of the main tube 816. The end cap 804, barrier 806, and cap 818 may be coupled to the respective components with a threaded connection or with another coupling mechanism (e.g., welding, a friction weld, brazing, interference fit, etc.). As shown in FIG. 5A, in some embodiments, the integrated spring damper 800 includes a locking mechanism, shown as locking mechanism 870. In one embodiment, the locking mechanism 870 is configured to position (e.g., lock, index, etc.) the end cap 804 in a target orientation relative to the main body 802. In one embodiment, the locking mechanism 870 includes a set screw that is tightened to facilitate locking the end cap 804 in the target orientation. The locking mechanism 870 may facilitate indexing a lower mount of the integrated spring damper 800 relative to other components thereof and thereby facilitate mounting integrated spring damper 800 onto a vehicle.

According to an exemplary embodiment, the integrated spring damper 800 includes a first mounting portion (e.g., a lower mounting portion, etc.), shown as eyelet 820, with which the integrated spring damper 800 is coupled to one portion of an axle assembly (e.g., a lower portion of the axle assembly, etc.). According to an exemplary embodiment, the integrated spring damper 800 is coupled on one end (e.g., with the eyelet 820 on a lower end, etc.) to a moveable member of the axle assembly (e.g., a lower support arm, etc.). According to an exemplary embodiment, the eyelet 820 is integrally formed with the end cap 804. As shown in FIG. 5A, the integrated spring damper 800 includes a second mounting portion (e.g., an upper mounting portion, a pin mount, etc.), shown as upper mount 807. The upper mount 807 is configured to couple an opposing second end (e.g., an upper end, etc.) of the integrated spring damper 800 to a vehicle body, frame member, or part thereof (e.g., chassis, side plate, hull, etc.), shown as side plate 1000.

According to an exemplary embodiment, the eyelet 820 includes an ear 902 and a second ear 904. In the example shown, the first ear 902 includes a first ear opening and the second ear 904 includes a second ear opening. The first and second ear openings are circular and of the same diameter. It should be understood that, in various alternative embodiments, the ear openings may be shaped differently or differently from one another. In the example shown, the ear openings in the first and second ears 902 and 904 are aligned with one another to facilitate the insertion of a mounting pin 906 through the ear openings.

In the example shown, the mounting pin 906 is substantially cylindrical-shaped and has a diameter that is less than the diameters of the ear openings (e.g., within a predetermined threshold of the diameters of the openings in the ears 902 and 904). In one embodiment, the length of the mounting pin 906 is greater than a distance between outer surfaces of the first and second ears 902 and 904. In response to the mounting pin 906 being inserted and centered, a first end 908 of the mounting pin 906 extends outwardly from the first ear 902. Additionally, a second end of the mounting pin 906 opposite the first end extends outwardly from the second ear 904. As described below with respect to FIGS. 6A-6I, in addition to being inserted into the ears 902 and 904 of the eyelet 820, the mounting pin 906 is also inserted through an element that is coupled to an axle assembly of a vehicle to rotatably couple the integrated spring damper 800 to the axle assembly. In some embodiments, the mounting pin 906 includes an opening 910 that extends from the first end 908 to the second end.

Figure 5D:
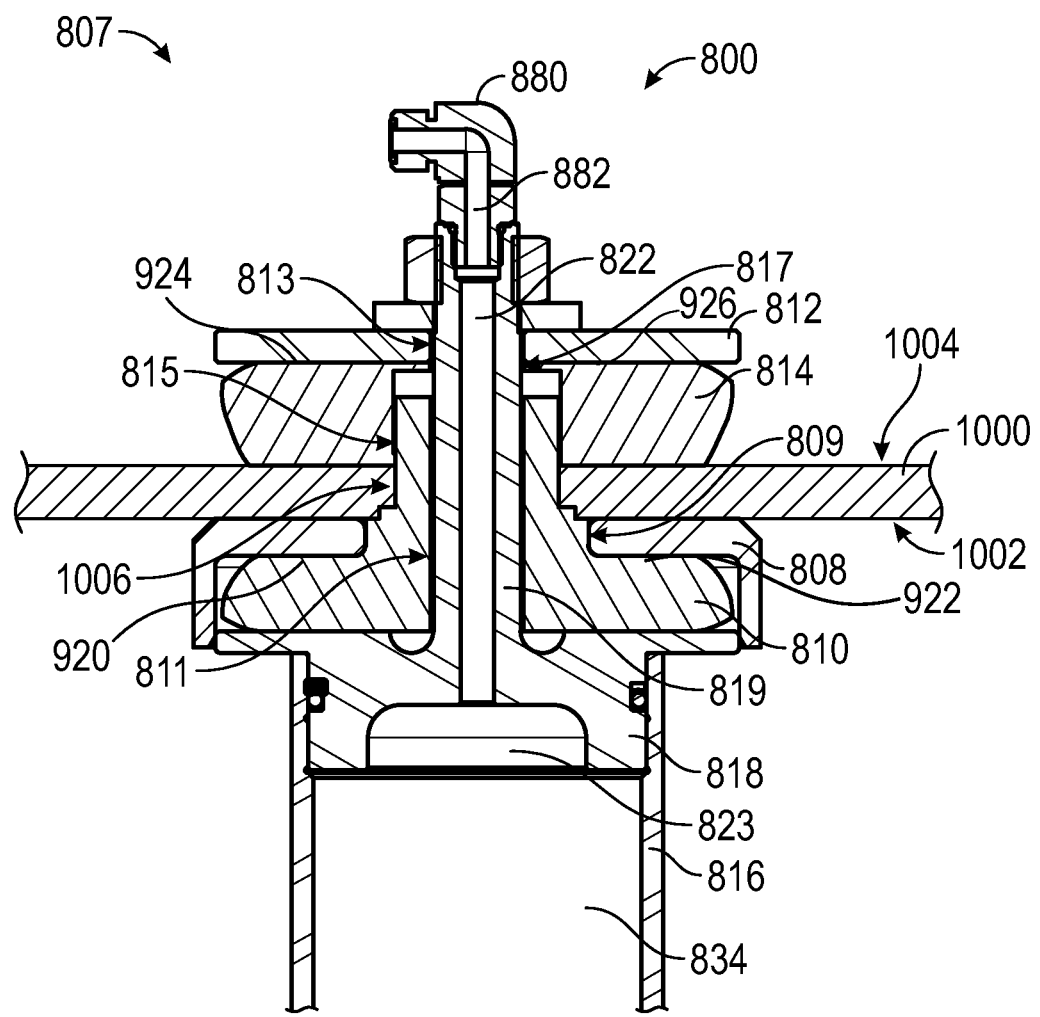
FIG. 5D is a detail view of an upper mount of the suspension element of FIG. 5C.

As shown in FIGS. 5A and 5C-5D, the upper mount 807 includes a first mounting member 808, a second mounting member 810, a third mounting member 812, and a fourth mounting member 814. As shown in FIGS. 5A and 5D, the first mounting member 808 is positioned such that a top surface of the first mounting member 808 abuts a first surface of the side plate 1000, shown as bottom surface 1002. In one embodiment, the first mounting member 808 is constructed from a metal or wear resistant material. As shown in FIG. 5C-5D, the second mounting member 810 includes a portion (e.g., a lower portion, a first portion, a non-protruded portion, etc.) that is positioned between the cap 818 and the first mounting member 808. In one embodiment, the second mounting member 810 is a resilient member, such as a flexible urethane, that serves as an isolator and an elastomeric spacer. The second mounting member 810 may be configured to isolate the cap 818 from at least one of the first mounting member 808 and the side plate 1000. In some embodiments, the first mounting member 808 and the second mounting member 810 are annular and circular in shape. In other embodiments, the first mounting member 808 and the second mounting member 810 have another shape (e.g., discus square, hexagonal, etc.).

In some embodiments, the first mounting member 808 may be friction welded to the second mounting member 810. For example planar portions of the surface of the first mounting member 808 that is to be disposed nearest the cap 818 may be forced against planar portions of the surface of the second mounting member 810 that is to be disposed nearest a side plate 1000. Rotational energy may be applied to at least one of the first mounting member 808 and the second mounting member 810 while the mounting members 808 and 810 are pressed against one another until friction welds 920 and 922 join the mounting members 808 and 810 together. In one embodiment, the first and second mounting members 808 and 810 are substantially circular and define apertures 809 and 811 through which a protruding portion 819 of the cap 818 extends. The friction welds 920 and 922 may circumferentially surround the aperture 809.

As shown in FIGS. 5A and 5D, the fourth mounting member 814 is positioned between the side plate 1000 and the third mounting member 812. As shown in FIG. 5D, a second surface, shown as top surface 1004, of the side plate 1000 is in contact with a bottom surface of the fourth mounting member 814, and the third mounting member 812 is disposed on a top surface of the fourth mounting member 814. The first mounting member 808 and the fourth mounting member 814 are spaced to receive the side plate 1000. In one embodiment, the fourth mounting member 814 is a resilient member, such as a flexible urethane, that serves as an isolator and an elastomeric spacer. The fourth mounting member 814 may be configured to isolate the third mounting member 812 from the side plate 1000. In one embodiment, the third mounting member 812 is constructed from a metal or wear resistant material. In some embodiments, the third mounting member 812 and the fourth mounting member 814 are annular and circular in shape. In other embodiments, the third mounting member 812 and the fourth mounting member 814 have another shape (e.g., discus square, hexagonal, etc.).

In some embodiments, the fourth mounting member 814 may be friction welded to the third mounting member 812. For example planar portions of the surface of the third mounting member 812 may be forced against planar portions of the surface of the fourth mounting member 814. Rotational energy may be applied to at least one of the third mounting member 812 and the fourth mounting member 814 while the mounting members 812 and 814 are pressed against one another until friction welds 924 and 926 join the mounting members 812 and 814 together. In one embodiment, the third and fourth mounting members 812 and 814 are substantially circular and define apertures 813 and 817 through which a protruding portion 819 of the cap 818 extends. The friction welds 924 and 926 may circumferentially surround the apertures 813 and 817.

As shown in FIG. 5D, the first mounting member 808 defines an aperture, shown as aperture 809, that corresponds with (e.g., aligns with, cooperates with, etc.) an aperture defined by side plate 1000, shown as side plate aperture 1006. The second mounting member 810 includes a protruded portion (e.g., a second portion, an upper portion, etc.) that extends through the aperture 809 and the side plate aperture 1006 and engages with a recess, shown as recess 815, defined by the fourth mounting member 814. In one embodiment, the recess 815 receives the protruded portion of the second mounting member 810. The second mounting member 810 defines an aperture, shown as bore 811, that extends longitudinally through the second mounting member 810 and aligns with (e.g., cooperates with, etc.) an aperture, shown as aperture 813, and an aperture, shown as aperture 817, defined by the third mounting member 812 and the fourth mounting member 814, respectively. The bore 811, aperture 813, and aperture 817 receive a protruded portion 819 of the cap 818.

As shown in FIG. 5C, a main piston, shown as main piston 824, is disposed in the internal volume of the main body 802. The main piston 824 is coupled to the main tube 816 and slidably engages the main body 802. The main piston 824 separates the internal volume into a first chamber 826 (e.g., compression chamber, etc.) and a second chamber 828 (e.g., extension chamber, etc.). The first chamber 826 is a generally cylindrical chamber that includes the portion of the internal volume of the main body 802 between the main piston 824 and the end cap 804. The second chamber 828 is an annular chamber defined between the main body 802 and the main tube 816 and extends between the main piston 824 and the barrier 806. When the main tube 816 translates relative to the main body 802, the main piston 824 changes the volume of the first chamber 826 and the second chamber 828. A dividing piston, shown as dividing piston 830 (e.g., floating piston, etc.), is disposed in the main tube 816 and slidably engages the main tube 816. The dividing piston 830 separates the internal volume of the main tube 816 into a first inner chamber 832 and a second inner chamber 834. According to an exemplary embodiment, the first inner chamber 832 is open to (i.e., in fluid communication with, etc.) the first chamber 826.

According to an exemplary embodiment, the first chamber 826, the second chamber 828, and the first inner chamber 832 contain a generally non-compressible fluid (e.g., hydraulic fluid, oil, etc.). According to an exemplary embodiment, the second inner chamber 834 contains a generally compressible fluid that may include (e.g., at least 90%, at least 95%) an inert gas such as nitrogen, argon, or helium, among others. In some embodiments, the second inner chamber 834 is in fluid communication with external devices, such as one or more reservoirs (e.g., central reservoir, tank, etc.), an accumulator, or a device allowing the pressure of the gas to be adjusted with a pressure regulation line. The pressure of the gas may be adjusted by removing or adding a volume of gas to adjust the suspension ride height.

According to an exemplary embodiment, the integrated spring damper 800 includes a pressure regulation line that is located at a top portion (e.g., a top end, an upper end, etc.) of the integrated spring damper 800. As shown in FIGS. 5A-5D, the integrated spring damper 800 includes a port, shown as pressure regulation port 880, coupled to the protruded portion 819 of the cap 818 (e.g., with a threaded interface, welded, etc.). As shown in FIGS. 5C-5D, the pressure regulation port 880 defines a passageway, shown as inlet passageway 882. The protruded portion 819 of the cap 818 defines a passageway, shown as intermediate passageway 822. The intermediate passageway 822 cooperates with the inlet passageway 882 to define the pressure regulation line of the integrated spring damper 800. The pressure regulation line extends from the pressure regulation port 880, through the protruded portion 819 of the cap 818, and into the second inner chamber 834 of the main tube 816. According to an exemplary embodiment, the pressure regulation line of the integrated spring damper 800 facilitates increasing or decreasing a volume of fluid (e.g., an inert gas, etc.) within the second inner chamber 834 of the main tube 816.

According to an exemplary embodiment, the pressure regulation port 880 is positioned at the top of the integrated spring damper 800 to provide a fixed or static location to fill or release gas from the second inner chamber 834 of the integrated spring damper 800. The pressure regulation port 880 is positioned to increase (e.g., maximize, etc.) the travel of the main tube 816 within the main body 802, thereby increasing the stroke of the integrated spring damper 800. By way of example, impulse forces transmitted to occupants within a vehicle from bumps, pot holes, etc. may be reduced by increasing the maximum stroke of the integrated spring damper 800. According to an exemplary embodiment, the pressure regulation port 880 is positioned above the side plate 1000 to reduce the risk of debris (e.g., dirt, rocks, mud, etc.) damaging or blocking the pressure regulation port 880.

When the integrated spring damper 800 is compressed or extended, the main tube 816 translates relative to the main body 802. The gas held in the second inner chamber 834 compresses or expands in response to relative movement between the main tube 816 and the dividing piston 830, which may remain relatively stationary but transmit pressure variations between the incompressible hydraulic fluid in the first inner chamber 832 and the compressible fluid in second inner chamber 834. The gas in the second inner chamber 834 resists compression, providing a force that is a function of the compressibility of the gas, the area of the piston, the volume and geometry of the second inner chamber 834, and the current state (e.g., initial pressure, etc.) of the gas, among other factors. The receipt of potential energy as the gas is compressed, storage of potential energy, and release of potential energy as the gas expands provide a spring function for the integrated spring damper 800.

In one embodiment, the dividing piston 830 defines a cup 831. According to the exemplary embodiment shown in FIG. 5C, the dividing piston 830 is positioned such that the cup 831 facilitates an increase in the volume of the second inner chamber 834. In other embodiments, the dividing piston 830 is positioned such that the cup 831 facilitates an increase in the volume of the first inner chamber 832. The dividing piston 830 may be flipped and repositioned to selectively increase the volume of the first inner chamber 832 or the second inner chamber 834 to tune the performance of the integrated spring damper 800. As shown in FIG. 12C, the cap 818 defines a pocket, shown as cap pocket 823. The cap pocket 823 is structured to increase the volume of the second inner chamber 834. In some embodiments, the cap pocket 823 and the cup 831 increase the volume of the second inner chamber 834. In other embodiments, at least one of the cap pocket 823 and the cup 831 are not defined by the cap 818 and the dividing piston 830, respectively. By way of example, increasing the volume of the second inner chamber 834 (i.e., decreasing the gas pressure within the second inner chamber 834, etc.) may facilitate a softer ride (e.g., a smaller spring force, etc.), while decreasing the volume of the second inner chamber 834 (i.e., increasing the gas pressure within the second inner chamber 834, etc.) may facilitate a stiffer ride (e.g., a greater spring force, etc.).

Referring again to FIG. 5C, a limiter, shown as recoil damper 836, is disposed within the internal volume of the main body 802, between the main piston 824 and the barrier 806. The recoil damper 836 reduces the risk of damage to the main piston 824, barrier 806, the sidewall of main body 802, and still other components of integrated spring damper 800 by reducing the forces imparted by the main piston 824 as it travels toward an end of stroke (i.e., the maximum travel of the stroke, etc.). According to an exemplary embodiment, the recoil damper 836 includes a recoil piston, shown as recoil piston 838, positioned within the second chamber 828 and a resilient member, shown as resilient member 839. The resilient member 839 may include an interlaced wave spring (i.e., a flat wire compression spring, etc.), a coil spring, or another type of spring. The resilient member 839 may be disposed between the recoil piston 838 and the barrier 806. According to an exemplary embodiment, the resilient member 839 is not intended to substantially resist the movement of the main piston 824 but positions the recoil piston 838 within the main body 802, such as after it has been displaced by the main piston 824. In other embodiments, the recoil damper 836 does not include a resilient member, and the recoil piston 838 may be repositioned using gravity or an alternative device.

Occupants within a vehicle experience large impulse forces as the main piston 824 contacts the barrier 806 or a component of the suspension system engages a hard stop. The recoil damper 836 reduces such impulse forces transmitted to occupants within the vehicle by dissipating a portion of the kinetic energy of the main piston 824 and the main tube 816 (i.e., provide a supplemental damping force, etc.) as the integrated spring damper 800 reaches an end of stroke (e.g., as the piston reaches a recoil end of stroke, as the piston reaches a jounce end of stroke, etc.).

Figure 5E:
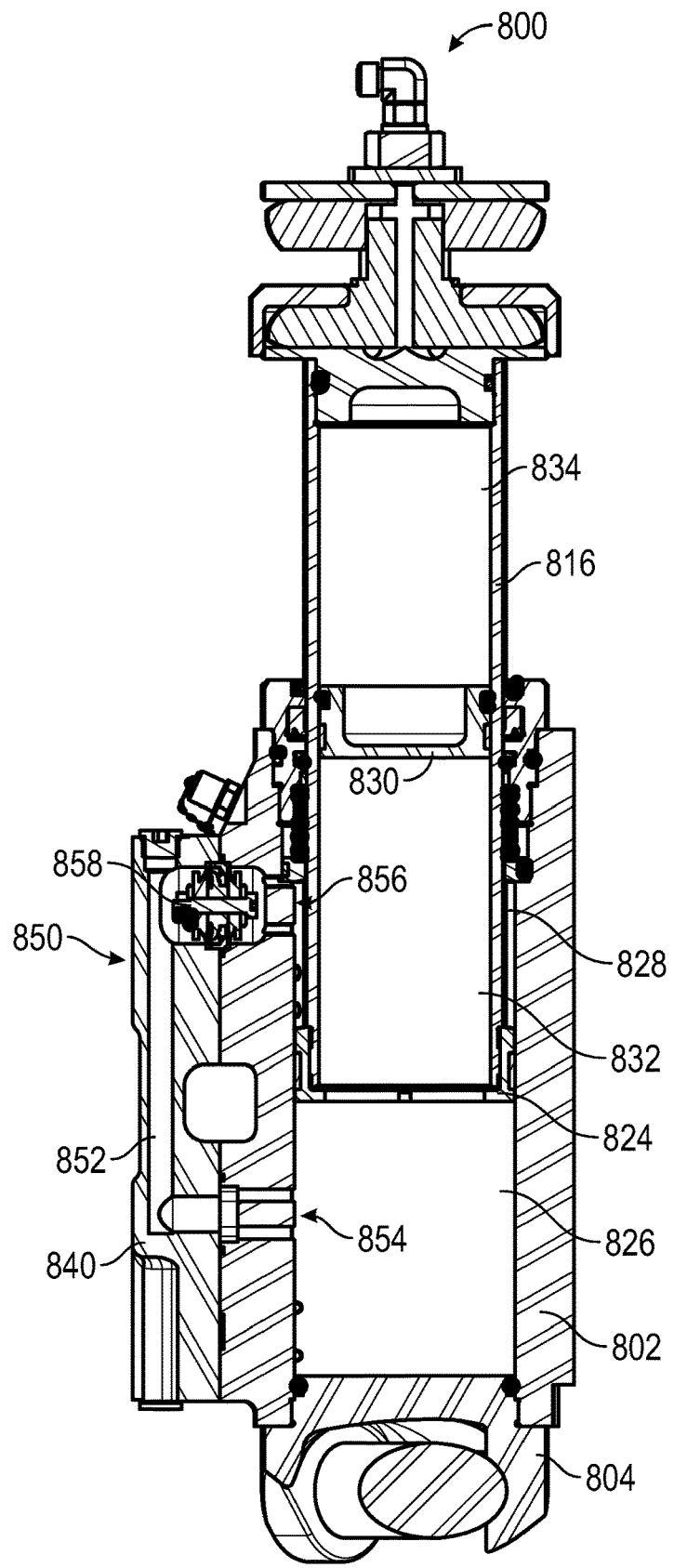
FIG. 5E is sectional view of the suspension element of FIG. 5A.
Figure 5F:
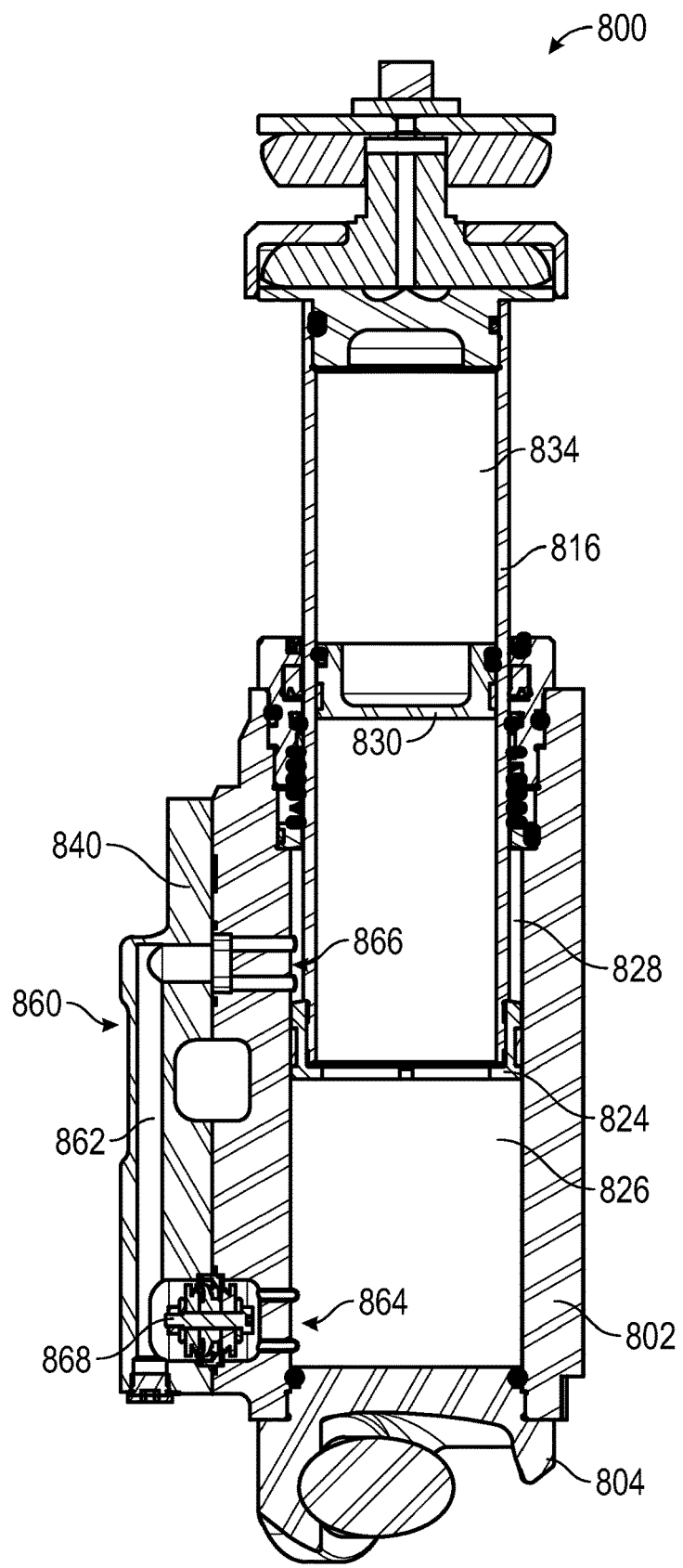
FIG. 5F is another sectional view of the suspension element of FIG. 5A.

Referring now to FIGS. 5E-5F, a first passage 852 and a second passage 862 may be disposed between the first chamber 826 and the second chamber 828. Fluid may flow between the first chamber 826 and the second chamber 828 through at least one of a first passage 852 (e.g., conduit, bore, etc.) of a flow path, shown as first flow path 850, and a second passage 862 of a flow path, shown as second flow path 860, defined by a manifold, shown as bypass manifold 840. In other embodiments, the bypass manifold 840 defines a different number of passages (e.g., one, three, etc.). According to an exemplary embodiment, the bypass manifold 840 is coupled to the side of the main body 802 (e.g., removably coupled to the main body 802 with a plurality of fasteners, etc.). In other embodiments, the bypass manifold 840 and the main body 802 are integrally formed (e.g., a unitary structure, etc.). According to an alternative embodiment, at least one of the first passage 852 and the second passage 862 are formed with tubular members coupled to an outer portion of the main body 802 or with flow passages defined by the main body 802.

According to the exemplary embodiment shown in FIGS. 5C and 5E-5F, damping forces are generated as the flow of fluid through the first passage 852 and the second passage 862 interacts with flow control devices, shown as a first flow control device 858 and a second flow control device 868. According to an exemplary embodiment, the first flow control device 858 and the second flow control device 868 are bidirectional flow valves disposed within the bypass manifold 840 along the first passage 852 and the second passage 862, respectively. The first flow control device 858 and the second flow control device 868 may include washers that differentially restrict a fluid flow based on the direction that the fluid is flowing. In other embodiments, the first flow control device 858 and the second flow control device 868 are other types of flow control device, such as pop off valves or orifices (e.g., variable flow orifices, etc.). In other embodiments, the first flow control device 858 and the second flow control device 868 are remotely positioned but in fluid communication with the first chamber 826 and the second chamber 828.

According to an exemplary embodiment, the main body 802 defines a plurality of sets of openings. As shown in FIG. 5E, the plurality of sets of openings include a first set having first openings 854 and second openings 856. The first openings 854 and the second openings 856 are fluidly coupled by the first passage 852, which is at least partially disposed between the first openings 854 and the second openings 856. As shown in FIG. 5F, the plurality of sets of openings include a second set having third openings 864 and fourth openings 866. The third openings 864 and the fourth openings 866 are fluidly coupled by the second passage 862. According to an exemplary embodiment, the first passage 852 and the second passage 862 are offset relative to one another both circumferentially and longitudinally along the length of the main body 802 and the bypass manifold 840. In other embodiments, the main body 802 defines a different number of sets of openings (e.g., one, three, four, etc.), each set corresponding with one of the passages defined by the bypass manifold 840.

According to an exemplary embodiment, the integrated spring damper 800 provides different damping forces in extension and retraction and also damping forces that vary based on the position of the main piston 824 relative to the main body 802 (e.g., position dependent dampening, etc.). According to an exemplary embodiment, the integrated spring damper 800 provides recoil damping forces in jounce and compression damping forces in recoil as part of a spring force compensation strategy. By way of example, the position dependent dampening of the integrated spring damper 800 may function as follows. As the main piston 824 translates within main body 802 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 824 within the main body 802.

Movement of the main tube 816 relative to the main body 802 translates the main piston 824, causing the volume of the first chamber 826 and the second chamber 828 to vary. When the integrated spring damper 800 compresses, the volume of the first chamber 826 decreases while the volume of the second chamber 828 increases. The fluid is forced from the first chamber 826 through at least one of the first openings 854 of the first passage 852 and the third openings 864 of the second passage 862 (e.g., based on the position of the main piston 824 within the main body 802, etc.). The fluid flows through at least one the first passage 852 and the second passage 862 past the first flow control device 858 and the second flow control device 868 and out of the second openings 856 and the fourth openings 866 into the second chamber 828. The resistance to the flow of the fluid along at least one of the first passage 852 and the second passage 862 and the interaction thereof with the first flow control device 858 and the second flow control device 868 provides a damping function for the integrated spring damper 800 that is independent of the spring function. By way of example, if the non-compressible fluid is able to flow through both the first passage 852 and the second passage 862, the dampening provided by the integrated spring damper 800 will be less than if fluid is able to flow through only one of the first passage 852 and the second passage 862. Therefore, as the main piston 824 moves towards the end cap 804, the integrated spring damper 800 provides a first dampening characteristic (e.g., less dampening, etc.) when the first openings 854 and the third openings 864 are active and a second dampening characteristics (e.g., more dampening, etc.) when only the third openings 864 are active (e.g., because the main piston 824 deactivates the first openings 854, which may include the first openings 854 being positioned within the second chamber 828, etc.).

Figure 6:
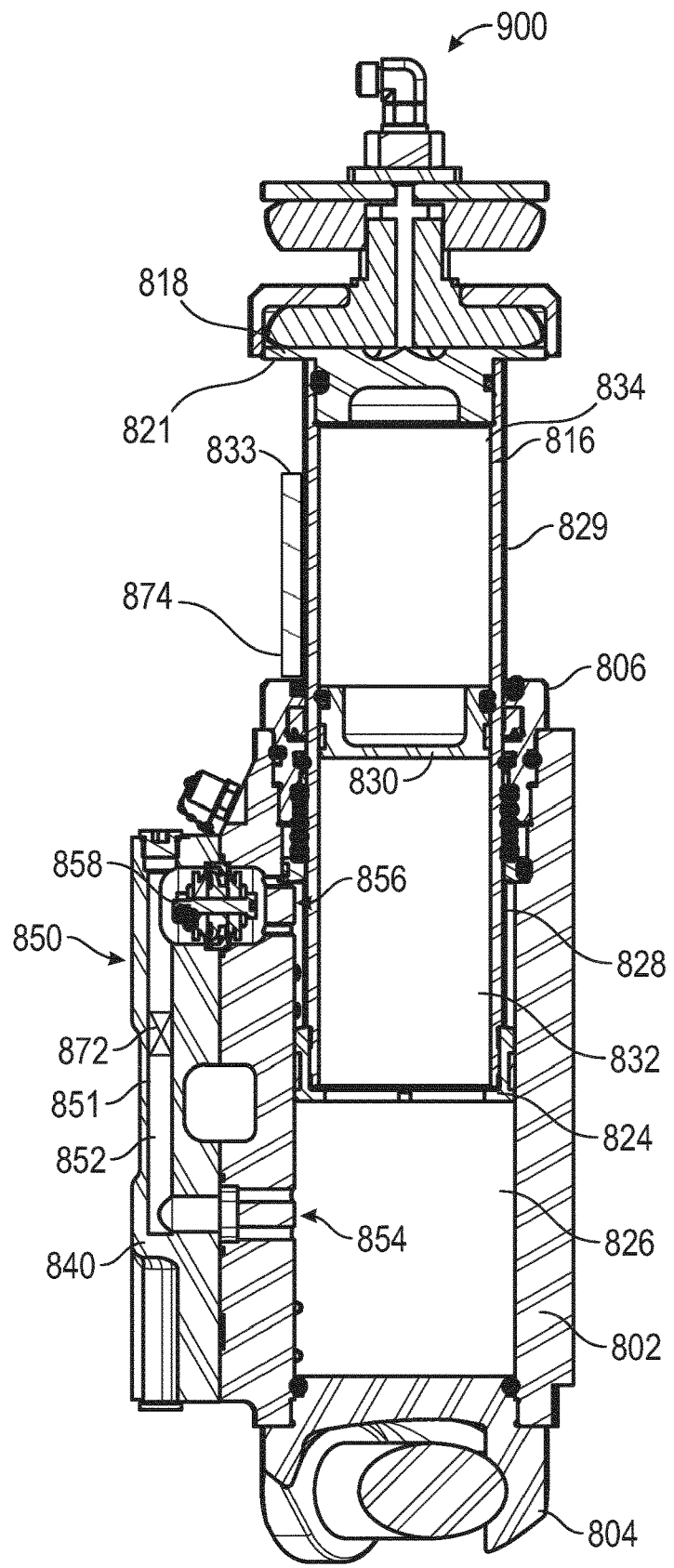
FIG. 6 is a sectional view of a suspension element, according to an illustrative embodiment.

Referring to FIG. 6, an integrated spring damper 900 is shown, according to another exemplary embodiment. The integrated spring damper 900 may be similar in construction to the integrated spring damper 800. Accordingly, like reference numerals are used in FIG. 6 to refer to features of the integrated spring damper 900 that may be similar to those of the integrated spring damper 800.

The integrated spring damper 900 includes one or more components that facilitate selectively reconfiguring the integrated spring damper 900 into a locking condition. As shown in FIG. 6, the integrated spring damper 900 includes a flow control element, shown as a valve 872. The valve 872 is disposed along a flow path between the first chamber and the second chamber. In the embodiment of FIG. 6, the valve 672 is positioned along a first passage 852, between the first chamber 826 and the second chamber 828. In one embodiment, the valve 872 is affixed to at least one of the surfaces 851 of the first passage 852 in a bypass manifold 840. For example, the surfaces that form the first passage 852 may include portions configured to couple with portions of the valve 872. In the example shown, the valve 872 is positioned approximately centrally within the first passage 852 (e.g., at a midpoint between first and second openings 854 and 856). In alternative embodiments, the valve 872 is positioned more proximate to either of the first and second openings 854 and 856. In another alternative embodiment, valve 872 is attached to or integrated with the fluid flow control device 858. In some embodiments, the valve 872 includes a seal that selectively prevents fluid flow between the valve 872 and the inner faces of the bypass manifold 840 that define the first passage 852.

In the example shown in FIG. 6, the integrated spring damper 900 includes a single valve 872. However, it should be understood that the integrated spring damper 900 may include additional valves that are similar in construction to the valve 872 in any other passages between the first and second chambers 826 and 828 (e.g., the second passage 862 shown in FIG. 5F, etc.). In an alternative embodiment, valves are provided at each of the first and third openings 854 and 864 of the main body 802.

In various embodiments, the valve 872 includes at least two flow states and is adjustable between the flow states. For example, in one embodiment, the valve 872 is a hydraulic pressure control valve that includes an open state and a closed state. In one embodiment, the valve 872 may switch between an open and closed state when the pressure difference between the fluid on either side of valve 872 in the first passage 852 reaches a predetermined threshold. In one embodiment, the valve 872 is configured to switch from an open state to a closed state when the pressure on the side of the valve 872 closer to the opening 856 is greater than the pressure on the side of the valve 872 closer to the opening 854 by more than a threshold amount. The valve 872 is thereby closed when the integrated spring damper 900 is in a relatively extended position. In an alternative embodiment, the orientation of the valve 872 is switched, and the valve 872 switches to the closed position when the integrated spring damper 900 is in a relatively contracted position.

In various alternative embodiments, the valve 872 is a solenoid valve that is selectively reconfigurable between an open state and a closed state. By way of example, the valve 872 may be selectively reconfigurable in response to the application of an electrical current. In some embodiments, the valve 872 includes a wireless transceiver configured to receive control signals from a central controller. The central controller may provide a control signal to the valve 872 in response to a user indicating a preference to operate a vehicle to which the integrated spring damper 900 is attached in a "lockout mode." Alternatively, the valve 872 may receive such a control signal with a wired connection to a central controller.

In an embodiment, the valve 872 is configured to prevent movement of the main tube 816 in a direction. When the valve 872 is switched to a closed state, further extension of the integrated spring damper 900 may be prevented (e.g., eliminated, etc.). Extension of the integrated spring damper 900 (i.e., translation of the main tube 816 in a direction away from the end cap 804) may produce a decrease in the volume of the second chamber 828 and an increase in the volume of the first chamber 826. Fluid is forced to flow through the first passage 852 into the first chamber 826 from the second chamber 828. Such fluid flow is prevented (e.g., eliminated, etc.) when the valve 872 is in a closed position. Further extension of the integrated spring damper 900 may be prevented (e.g., eliminated, etc.) when the fluid in the second chamber 828 is substantially compressed.

However, the valve 872 may not prevent further compression of the integrated spring damper 900. In other words, the fluid (e.g., the gas, etc.) in the second inner chamber 834 may not be maximally compressed, so the main tube 816 may still able to traverse towards the end cap 804. While the inclusion of the valve 872 facilitates a single-direction locking of the integrated spring damper 900, the valve 872 may not facilitate (e.g., may not entirely or completely facilitate or provide, etc.) bi-directional locking.

The integrated spring damper 900 includes a locking member, shown as a bar 874, that is configured to prevent further compression of the integrated spring damper 900 beyond a predetermined amount. As shown in FIG. 6, the bar 874 is disposed between the barrier 806 and the cap 818, proximal an outer surface 829 of the main tube 816. In one embodiment, the bar 874 is affixed to an outer surface 829 of the main tube 816 (e.g., welded, etc.). In response to the lower surface of the bar 874 contacting the barrier 806, further compression of the integrated spring damper is prevented by the bar 874. The bar 874 may thereby facilitate configuring the integrated spring damper 900 in a "locking position." Together the valve 872 and the bar 874 are configured to prevent movement of the integrated spring damper 900. Thus, if the valve 872 is closed to prevent further extension when the bar 874 contacts the barrier 806, the integrated spring damper 900 is substantially locked out. Locking out the integrated spring damper 900 may facilitate transporting an associated vehicle (e.g., locking the suspension in a compressed or kneel position to clear an opening of a transport plane, etc.) and/or otherwise operating an associated vehicle (e.g., locking the suspension in position to hold the height of associated mission equipment stable, to provide enhanced ground clearance, etc.).

In the example shown, the bar 874 only extends around a portion of the outer circumference of the main tube 816. The bar 874 is in a circumferential position relative the main tube 816 that is substantially aligned with the bypass manifold 840. However, in various alternative embodiments, the bar 874 may be positioned at any rotational position on the outer circumference of the main tube 816. Additionally, in an alternative embodiment, the bar 874 may be positioned such that an upper end 833 thereof contacts or is approximately flush with a lower surface 821 of the cap 818. As a result, when the integrated spring damper 900 is in a locking position, the bar 874 is pressed between the cap 818 and the barrier 806. Such a position places less strain on the joint between the bar 874 and the main tube 816. The bar 874 may additionally or alternatively attach to the cap 818 and/or the barrier 806.

The integrated spring damper 900 may additionally or alternatively include other systems to prevent compression thereof. For example, rather than having the bar 874 affixed to the main tube 816, which reduces the operational range of the integrated spring damper 900, the bar 874 may be separate from the main tube 816. For example, the bar 874 may be affixed to an external actuator that is attached to a support arm or other portion of a vehicle. The actuator may be configured to receive a control signal from a controller in response to a user indicating a preference to operate a vehicle in a particular transmission mode. The control signal may cause the actuator to position the bar 874 adjacent to the main tube 816 to lock out the integrated spring damper 900. In an alternative embodiment, such a control signal may be provided in response to the main tube 816 traversing a predetermined distance within the inner volume defined by the main body 802. For example, the integrated spring damper 900 may include a position sensor that detects the position of the cap 818 relative to the barrier 806. In one embodiment, when the position sensor detects that the cap 818 is within a predetermined distance of the barrier 806 a control signal is provided to position the bar 874 and to close the valve 872.

In various embodiments, to prevent recoil forces that may result from the bar 874 contacting the barrier 806 and/or cap 818, the integrated spring damper 900 may include additional recoil dampers disposed at the barrier 806 and/or cap 818. The recoil dampers may include springs (e.g., a flat wire compression spring, etc.) that are configured to counteract the force resulting from the bar 874 translating towards the barrier 806 or the cap 818.

Figure 7:
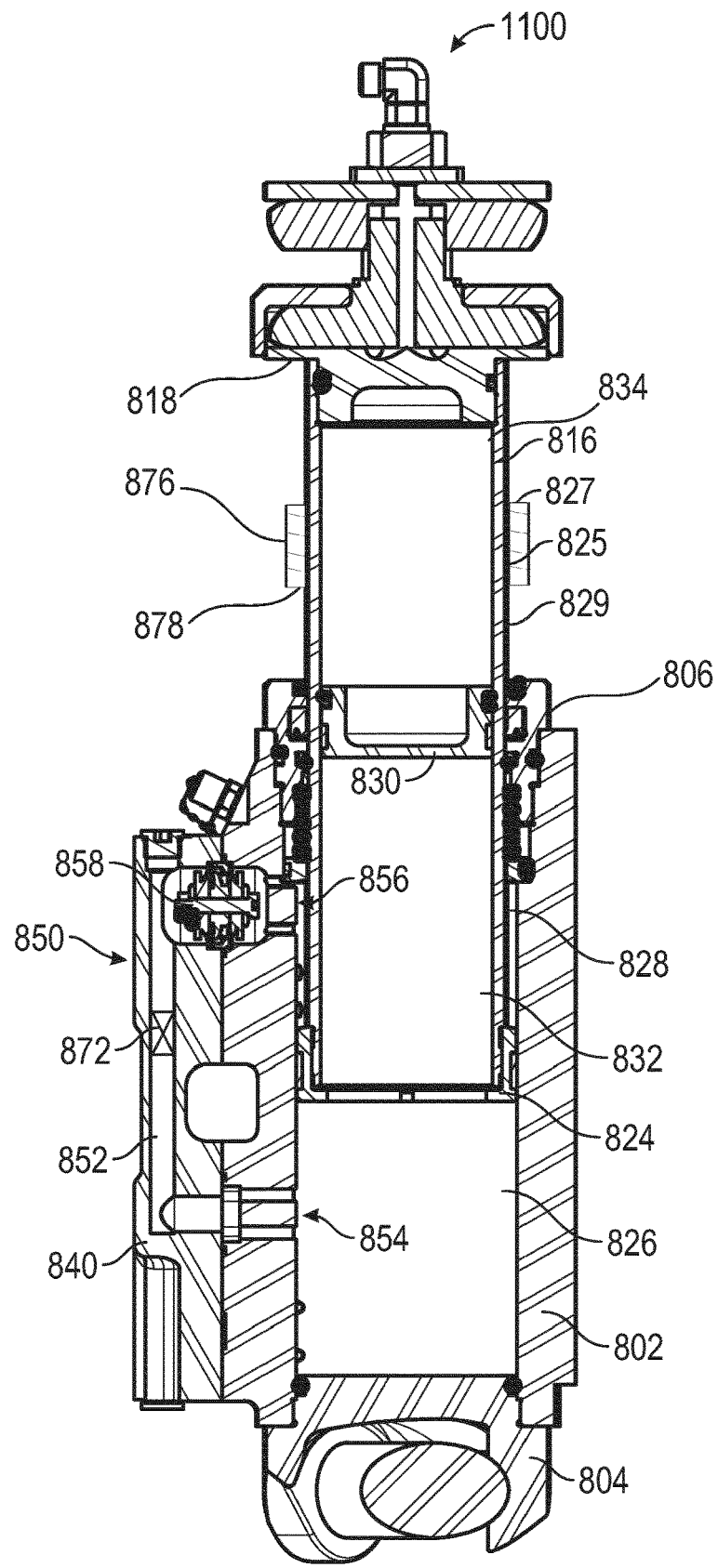
FIG. 7 is a sectional view of a suspension element, according to an illustrative embodiment.

Referring to FIG. 7, an integrated spring damper 1100 is shown, according to another exemplary embodiment. The integrated spring damper 1100 is similar in construction to the integrated spring damper 900 discussed above in that the valve 872 is inserted into the first passage 852 to prevent fluid flow between the first and second chambers 826 and 828.

Rather than the bar 874 discussed above, the integrated spring damper 1100 includes an alternative locking member, shown as a collar 876. The collar 876 extends around the outer surface 829 of the main tube 816. In one embodiment, the collar 876 is annular, and includes an inner surface 825 that is approximately flush with the outer surface of the main tube 816. The inner surface of the collar 876 may be affixed to the outer surface of the main tube 816 (e.g., welded, etc.). In response to a lower end 878 of the collar 876 contacting the barrier 806, further extension or compression of the integrated spring damper 1100 is prevented.

In one embodiment, the collar 876 extends around the entirety of the circumference of the main tube 816 such that it entirely surrounds the main tube 816. In an alternative embodiment, the collar 876 is semi-circular and extends around only a portion (e.g., half, etc.) of the circumference of the main tube 816. The extension of the collar 876 around the circumference of the main tube 816 provides a relatively large contact surface to be formed between the collar 876, the main tube 816, and the barrier 806 when the collar 876 is placed in such a position. Thus, forces resulting from the collar contacting the barrier 806 (or any dampers attached thereto) are spread over these large contact surfaces.

The collar 876 may be otherwise shaped, positioned, and/or actuated. In one embodiment, the collar 876 is disposed at an upper end of the main tube 816 such that an upper surface 827 thereof is approximately flush with the cap 818. The positioning of the lower end 878 may be related to the height of the collar 876. The degree to which the integrated spring damper 1100 needs to be compressed prior to reaching the locking position may vary with the height of the collar 876. Additionally, as with the bar 874 discussed above, the collar 876 may be selectively repositioned with an actuator. In such embodiments, the full operational range of the integrated spring damper 1100 is ensured when locking out the integrated spring damper 1100 is not desired.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A suspension element comprising:
   a main body having an internal volume, the main body including a barrier and an end cap, wherein the barrier and the end cap are disposed at opposite ends of the main body;
   a tubular element inserted through the barrier, wherein the tubular element is slidably engaged with the main body;
   a main piston coupled to the tubular element, wherein the main piston separates the internal volume of the main body into a first chamber and a second chamber;
   a flow control element disposed along a flow path between the first chamber and the second chamber, the flow control element configured to substantially prevent movement of the tubular element relative to the main body in only one direction; and
   a locking member disposed proximal an external surface of the tubular element, the locking member configured to engage the barrier when the main piston traverses at least a predetermined distance towards the end cap, wherein together, the flow control element and the locking member are configured to prevent movement of the tubular element relative the main body.

2. The suspension element of claim 1, wherein the tubular element is configured to translate relative the main body between an extended position where the main piston is proximate to the barrier and a compressed position where the main piston is proximate to the end cap, and wherein simultaneously the flow control element prevents further movement of the tubular element toward the extended position and the locking member prevents further movement of the tubular element toward the compressed position.

3. The suspension element of claim 1, wherein the flow control element includes at least two flow states and is adjustable between the flow states.

4. The suspension element of claim 1, wherein the locking member is affixed to an outer surface of the tubular element.

5. The suspension element of claim 1, wherein the locking member only extends around a portion of the outer circumference of the tubular element.

6. The suspension element of claim 1, wherein an upper end of the locking member is approximately flush with a cap disposed on the tubular element.

7. The suspension element of claim 1, wherein the locking member is affixed to an actuator, and wherein a control signal provided in response to the main piston traversing a predetermined distance causes the actuator to position the locking member adjacent to the tubular element.

8. The suspension element of claim 1 further comprising a passage disposed between the first chamber and the second chamber, wherein the flow control element is disposed along the passage.

9. The suspension element of claim 8, wherein the flow control element is affixed to a surface of the passage.

10. The suspension element of claim 8, the main body further comprising:
 a first opening fluidly connected to the first chamber; and
 a second opening fluidly connected to the second chamber;
 wherein:
  the passage is at least partially disposed between the first opening and the second opening, and
  the flow control element is configured to switch from an open state to a closed state when the pressure at the first opening is greater than the pressure at the second opening by more than a threshold amount.

11. The suspension element of claim 1, wherein the locking member is a collar that extends around the entire circumference of the tubular element.

12. The suspension element of claim 11, wherein an inner surface of the collar is approximately flush with an outer surface of the tubular element, and wherein the inner surface of the collar is affixed to the outer surface.

13. The suspension element of claim 11, wherein an upper surface of the collar is approximately flush with a cap disposed on the tubular element.

* * * * *